(12) United States Patent
Lozano et al.

(10) Patent No.: US 7,608,321 B2
(45) Date of Patent: Oct. 27, 2009

(54) INSULATED PROPELLANT CONTAINER

(75) Inventors: Martin E. Lozano, Whittier, CA (US); Michael V. Merlin, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 11/619,594

(22) Filed: Jan. 3, 2007

(65) Prior Publication Data

US 2007/0131128 A1    Jun. 14, 2007

Related U.S. Application Data

(62) Division of application No. 10/643,827, filed on Aug. 18, 2003, now Pat. No. 7,174,618.

(51) Int. Cl.
   *B32B 7/08* (2006.01)

(52) U.S. Cl. .......................... 428/223; 428/76; 428/68; 428/36.5; 428/304.4; 220/560.15; 220/592.25; 220/902

(58) Field of Classification Search ................ 428/35, 428/7, 36.4, 36.9, 36.91, 174, 76, 68, 36.5, 428/100, 223, 304.4; 220/560.15, 592.25, 220/902
See application file for complete search history.

(56) References Cited

U.S. PATENT DOCUMENTS

| | | | | |
|---|---|---|---|---|
| 3,753,848 | A | * | 8/1973 | Bennett ...................... 428/179 |
| 3,951,718 | A | | 4/1976 | Gonzalez |
| 4,009,236 | A | | 2/1977 | Katsuta |
| 4,170,952 | A | | 10/1979 | McCown |
| 4,239,564 | A | * | 12/1980 | Krumweide ................. 156/79 |
| 4,548,083 | A | | 10/1985 | Schuerer et al. |
| 6,584,749 | B2 | * | 7/2003 | Sperber ...................... 52/742.1 |

* cited by examiner

*Primary Examiner*—Michael C Miggins
(74) *Attorney, Agent, or Firm*—Tung & Associates

(57) ABSTRACT

Methods and apparatuses are provided for preventing debonding of insulation from a propellant container surface. When assembled to a propellant container, the container includes a substrate having an outer surface, a base material having an overall rough outer surface relative to the outer surface of the substrate, and an adhesive material adhering the base material to the substrate. Alternately, the base material may be welded to the outer surface of the substrate.

20 Claims, 1 Drawing Sheet

INSULATED PROPELLANT CONTAINER

RELATED APPLICATION

This application is a divisional of U.S. patent application Ser. No. 10/643,827, filed Aug. 18, 2003 now U.S. Pat. No. 7,174,618.

TECHNICAL FIELD

The present invention generally relates to foam insulation, and more particularly relates to insulation for cryogenic tanks, and mechanisms for strengthening the foam and the bond between the foam and the cryogenic tanks.

BACKGROUND

Cryogenic liquid oxygen and hydrogen propellant tanks used on launch vehicles typically require foam insulation. The foam insulation prevents environmental heat leak into the liquid bulk, and also prevents liquid air or ice formation on the tank surface. There is a slight tendency for the foam insulation currently used to insulate propellant tanks to crack and separate due to induced stresses during thermal contraction of the metal skin of the propellant tank. Once the foam is cracked and separated, moisture and air can be cryo-pumped into the insulation cavity. The moisture and air can solidify in these cavities to form ice, solid carbon dioxide, solid nitrogen, etc. The formation of such solids in the foam cavity during loading or ground hold can further increase the cracks in the foam material.

A primary concern regarding the factors of cracked insulation and ice formation is the increased potential for insulation to fall off the propellant tanks due to these factors. It is theorized that insulation loss may occur as ice under the insulation is rapidly heated during the ascent or descent of a launch vehicle. Rapid vaporization of solids results in a pressure build-up under the insulation, and it is thought that perhaps this pressure may cause the insulation to be pried from the propellant tanks.

Accordingly, it is desirable to provide a method for accomplishing the goal of improving adhesion of foam insulation, such as spray-on foam insulation, to any necessary surface of an appropriate aeronautic vehicle. In addition, it is desirable to provide a mechanical retention device that is useful in accomplishing such a method. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for preventing de-bonding of insulation from a propellant container surface. When assembled to a propellant container, the container comprises a substrate having an outer surface, a base material having an overall rough outer surface relative to the outer surface of the substrate, and an adhesive material that adheres the base material to the substrate.

A method is also provided for preventing de-bonding of insulation from a propellant container. The method comprises a first step of providing a substrate that forms at least a part of the propellant container and has an outer surface. Then, a base material is provided, having an overall rough outer surface relative to the outer surface of the substrate. Finally, the base material is adhered to the substrate.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
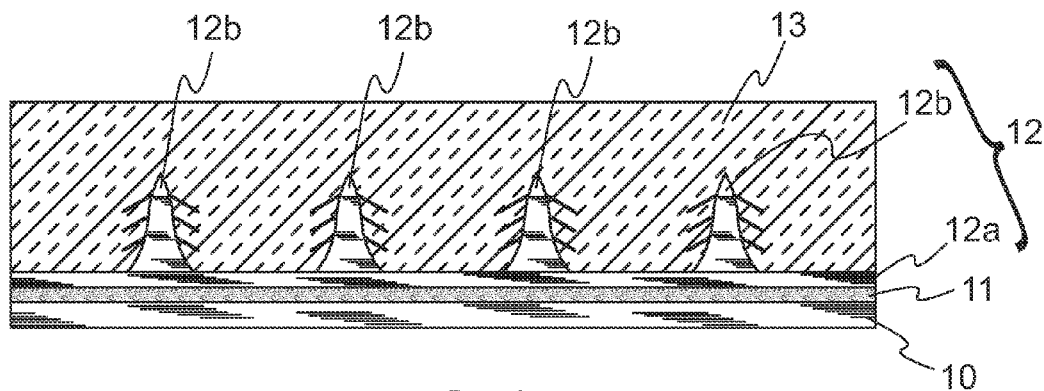
FIG. 1 shows a cross-sectional view of a substrate with a barb-containing material adhered thereto according to a first embodiment of the invention.

In order to overcome the problem of de-bonding of foam insulation from cryogenic propellant tanks, other relatively smooth substrates, or any substrate to which foam insulation has the potential to lose its bond strength over time, various embodiments of the present invention are directed to a retention material that increases the holding action of the foam insulation to the substrate. In FIG. 1, an exemplary retention material 12 is shown that includes a base material 12a, and numerous retaining formations. The retaining formations serve as grabbing fingers which closely hold an insulating material 13 against the base material 12a and to a substrate to which the base material 12a is attached. The retaining formations in FIG. 1 are shown as barbed extensions 12b. Because the barbed extensions 12b are pointed at their distal portion, relative to the base material 12a, and the barbed fingers reach back toward the base material, the insulation material 13 can only be brought closer to the base material 12a over time, but will at no time thereafter pull away from the base material 12a and from the substrate to which the base material 12a is attached.

The barbs 12b shown in FIG. 1 represent only one embodiment of possible equivalent extensions that are a part of the present invention. For example, while the barbs 12b as shown are formed in threes on each extension, the number of barbs can be as little as one, or much higher than three, depending on such factors as the thickness of the insulation material that is held against the base material 12a and the substrate to which the base material 12a is attached, and the tendency for the insulation material to be pried from the substrate.

As discussed above, a tendency for the insulation to pull away from the substrate is a product of the environment to which the insulation will be exposed. Therefore, if the insulation is not likely to be exposed to a high heat and pressure environment during which ice and other solids could vaporize and form gases that would pry the insulation from a base, then a single barb per extension 12b may be suitable for each extension from the base material 12a. In contrast, for launch vehicles that reach very high velocities or accelerate extremely rapidly, three or more barbs per extension 12b may provide additional needed grabbing strength.

In an exemplary embodiment of the invention, the barbs 12b or other extensions do not extend more than ½ inch above the base material 12a. Most preferably, the barbs 12b or other extensions extend between ¼ inch and ½ inch above the base material 12a. Of course, if the insulation 13 is not more than ½ inch thick, then the extensions can be much smaller, and in any event need not extend through more than about ¼ of the thickness of the insulation 13.

In FIG. 1, the retention material 12 is adhered to a metal substrate 10. The retention material 12 is adhered by tack welding or by using a cryogenic metal-adhesive material 11 which is well known in the art. Examples of suitable cryogenic adhesives include rubber compounds such as silicone RTV, or tough, resilient epoxy resins. The adhesive 11 may be applied to the substrate 10 prior to application of the retention material. However, in order to minimize cost, it is preferable to apply the adhesive material 11 to a contact surface of the retention material 12. Consequently, the retention material 12 may be adhered to the substrate in the form of a tape that can be applied to the substrate in critical areas.

In an exemplary embodiment, the substrate 10 is a tank, a feed line, or other container capable of directly or indirectly containing cryogenic liquids. The tank may contain cryogenic liquids held directly in contact with the walls of the tank, or the walls of the tank may be separated from the cryogenic fluids by one or more layers of insulating material. Alternatively, the tank may include a housing that surrounds one or more smaller cryogenic containers. The tank walls are typically metallic, but may be constructed of polymeric materials or other structural materials capable of withstanding the temperature fluctuations due to the loading and unloading of cryogenic fluids. While an example of the tank is provided below in which the tank is a fuel tank of a spacecraft, such as the Space Shuttle, the reinforced insulation is useful with tanks utilized in other applications as well.

In the example where the substrate is a propellant tank, the tape that is the retention material 12 can be wrapped partially or completely around the tank. There may only be a need for the additional retention strength at a few locations on the tank, so expenses and work time can be greatly reduced by placing the tape at those high risk locations on the propellant tank.

Alternatively, the retention material 12 can be formed as large sheets that can be tailored to cover the tank as a whole. For example, the retention material 12 may cover the tank in its entirety, and the extensions may be strategically located at areas of the retention material where there is a relatively strong likelihood of insulation de-bonding.

In the above embodiment, the tape is formed as a planar sheet that can be wrapped around a tank or other curved surface. Other embodiments of the invention may incorporate the base material 12a as a mesh or net, which would greatly decrease the weight and cost of the retention material 12 as a whole. Also, the base material 12a may have a corrugated upper surface, thereby maximizing the surface area to which the insulation 13 is adhered. If extensions are included, apart from the extensions naturally formed due to a corrugated surface or a net, it is preferable to minimize the weight of the retention material 12 by separating the extensions as much as is practical. In the embodiment where the substrate is a propellant tank such as a hydrogen or oxygen tank, it is sufficient to disperse the extensions such as the barbs 12b in FIG. 1 apart from one another by ½ to 1 inch.

Figure 2:
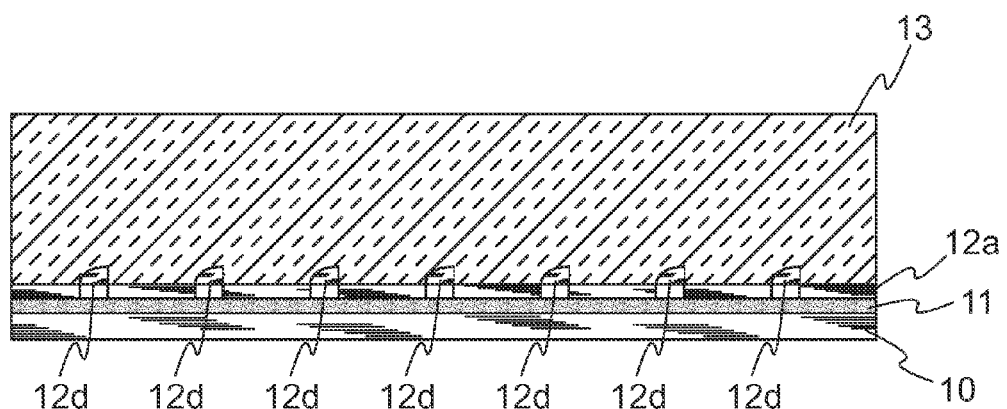
FIG. 2 shows a cross-sectional view of a substrate with a machine-punched base material adhered thereto according to a second embodiment of the invention.

In another embodiment of the invention, shown in FIG. 2, the base material 12a has extensions 12d that are formed by machine punching the base material 12a in, for example, a semicircle shape. The machine punching forces a portion of the base material 12a to protrude above the plane of the base material 12a, and to have an edge in the form of an arc which can hold the insulation 13 in place. At least a portion of the overall retention material in this embodiment would have the appearance of a cheese grater.

It is crucial that the retention material 12, including the extensions protruding from the base material 12a, be made of a material that is sufficiently strong to withstand an extreme environment in terms of temperature and pressure. In an exemplary embodiment of the invention, the retention material 12 has a low thermal conductivity. Most preferably, the retention material 12 is a durable polymer such as nylon or a phenolic resin or other non-metallic material that has a low thermal conductivity, which benefits the overall structure by providing needed retention strength without substantially decreasing the thermal insulating properties provided by the insulation 13. Alternatively, the retention material 12 may be formed from a metal such as aluminum or a suitable aluminum alloy. An alternate means of bonding a metallic retention material 12 to a tank would be welding such as tack-welding, depending on the compatibility of the substrate and retention material.

According to one embodiment of the invention, the extensions and the base material 12a are uniform in terms of material in order to maximize the strength of the retention material as a whole. However, it is understood that various alloys, materials, and joining methods are effective to obtain a retention material that provides a retentive force as necessary according to the principles of the present invention. For example, instead of having a uniform material that forms both the base material 12a and the extensions, protrusions such as the barbs 12b in FIG. 1 could be pounded through the base material 12a. The barbs 12b could have a flat head which can be used to pound the barbs 12b through the base material 12a, but remains on the adhesive side of the base material 12a to hold the barbs 12b in place.

In FIG. 1, the insulation material 13 is held firmly against the substrate 10 due to the use of the retention material 12. The insulation material 13 that is commonly used in launch vehicles is known as spray-on foam insulation (SOFI), although the principles of the present invention may be applied to other typed of insulation as well. The spray-on foam insulation (SOFI) may be closed cell or open cell foam, as typically applied to cryogenic storage and feed distribution systems, that adheres directly to the surface of the substrate 10. Suitable foams include but are not limited to closed-cell polyurethane, polystyrene, rubber, and silicones. An example of such a spray-on foam is Corbond® II, a spray-on polyurethane foam having a density of 1.8 lb/ft$^3$, closed cell content of 93%, and tensile strength of 35 psi, available from Corbond Corporation, Bozeman, Mont. The foam is applied in one or several passes to the desired thickness, although the necessary thickness varies greatly according to the type of surface to which the insulation 13 is adhered. For fuel tanks such as hydrogen and oxygen tanks, the insulation thickness can range between less than ¼ inch and more than 2 inches.

Figure 3:
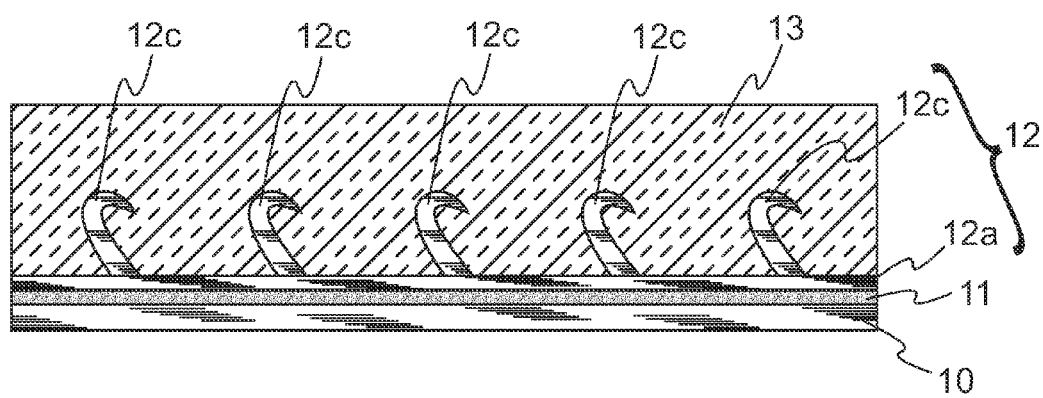
FIG. 3 shows a cross-sectional view of a substrate with a hook-containing material adhered thereto according to a third embodiment of the invention.

In FIG. 3, a third embodiment of the invention is shown. The materials in FIG. 3 and their functions are the same as those discussed above in reference to FIG. 1 where identical reference numerals are used. A second exemplary retention material 12 is shown that includes the base material 12a, and numerous extensions. The extensions again serve as grabbing fingers which closely hold the insulating material 13 against the base material 12a and to the substrate 10 to which the base material 12a is attached. The extensions in FIG. 3 are shown as hooked extensions 12c. Of course, the embodiments shown in FIGS. 1 to 3 are mere examples of the numerous hooks, barbs, prongs, etc. that may provide the retention strength that is necessary under the principles of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A propellant container, which comprises:
   a substrate, forming at least a part of said propellant container, and having an outer surface; and
   a base material, having a rough outer surface relative to said outer surface of said substrate, covering said substrate;
   extensions extending from said base material that extend in a first direction away from said substrate outer surface, said extensions further comprising extension portions that extend in a second direction toward said substrate outer surface without extending to said base material;
   an insulation material disposed over said base material, said insulating material encapsulating said extensions, wherein said extensions are adapted to hold said insulating material against said substrate.

2. A propellant container according to claim 1, wherein said insulation material is spray-on foam insulation.

3. A propellant container according to claim 1, wherein said base material outer surface is corrugated.

4. A propellant container according to claim 1, wherein said base material is a mesh sheet having openings therein.

5. A propellant container according to claim 1, wherein said extension portions comprise semicircle shaped edges, said edges comprising the same material as said base material.

6. A propellant container according to claim 1, wherein said extension portions comprise fingers.

7. A propellant container according to claim 1, wherein said extensions comprise hooked formations.

8. A propellant container according to claim 1, wherein said extensions comprise barbed formations.

9. A propellant container according to claim 1, wherein said extensions are spaced apart from one another by between about ½ inch and about 1 inch.

10. A propellant container according to claim 1, wherein said extensions are spaced apart from one another non-uniformly, with a higher concentration of said extensions being disposed in a predetermined region, said predetermined region comprising a region where said insulation material disposed over said base material outer surface is most likely to de-bond from said substrate.

11. A propellant container according to claim 1, which further comprises an adhesive material adhering said base material to said substrate.

12. A propellant container according to claim 1, wherein said base material is tack-welded to said substrate.

13. A propellant container according to claim 1, wherein said propellant container comprises an aeronautic vehicle.

14. A propellant container according to claim 1, wherein said extension portions comprise the same material as said base material.

15. An insulated container, which comprises:
    a substrate having an outer surface;
    a base material, having a rough outer surface relative to said outer surface of said substrate, covering said substrate; and
    extensions extending from said base material that extend in a first direction away from said substrate outer surface, said extensions further comprising extension portions selected from the group consisting of barbs, hooks, and edges that extend in a second direction toward said substrate outer surface without extending to said base material;
    an insulation material disposed over said outer surface of said base material, said insulating material encapsulating said extensions, wherein said extensions are adapted to hold said insulating material against said substrate.

16. The insulated container of claim 15, wherein said insulation material is spray-on foam insulation.

17. The insulated container of claim 15, wherein said extension portions comprise the same material as said base material.

18. The insulated container of claim 15, wherein said base material outer surface is corrugated.

19. The insulated container of claim 15, wherein said base material is a mesh sheet having openings therein.

20. The insulated container of claim 15, wherein said insulated container comprises a propellant container of an aeronautic vehicle.

* * * * *